(12) United States Patent
Moore et al.

(10) Patent No.: US 6,848,522 B2
(45) Date of Patent: Feb. 1, 2005

(54) SYSTEMS FOR CONNECTING A GROUND-ENGAGING MOTIVE DEVICE TO A VEHICLE AND RELATED METHODS

(75) Inventors: Donald E. Moore, Lexington, KY (US); Steven F. Wilms, Lexington, KY (US); Yukitsugu Suzuki, Aichi (JP)

(73) Assignees: Link-Belt Construction Equipment Co. L.P. , LLLP, Lexington, KY (US); Sumitomo Construction Machinery, Lexington, KY (US)

( * ) Notice: Subject to any disclaimer, the term of this patent is extended or adjusted under 35 U.S.C. 154(b) by 89 days.

(21) Appl. No.: 10/126,188

(22) Filed: Apr. 19, 2002

(65) Prior Publication Data

US 2003/0196839 A1 Oct. 23, 2003

(51) Int. Cl.[7] .................................................. B60S 9/02
(52) U.S. Cl. ..................................... 180/9.1; 280/763.1
(58) Field of Search .......................... 280/765.1, 764.1, 280/763.1; 180/7.1, 9, 9.1, 9.21, 9.28, 9.26

(56) References Cited

U.S. PATENT DOCUMENTS

| | | | |
|---|---|---|---|
| 1,705,578 A | | 3/1929 | Lichtenberg |
| 3,638,805 A | * | 2/1972 | Gamier ........................ 212/175 |
| 3,712,398 A | | 1/1973 | Althaus |
| 3,841,717 A | * | 10/1974 | Parisotto et al. ............. 305/127 |
| 3,899,038 A | | 8/1975 | Griffith et al. |
| 3,938,606 A | * | 2/1976 | Yancey ........................ 180/9.5 |
| 3,945,451 A | * | 3/1976 | Aaen .......................... 180/9.52 |
| 3,998,286 A | | 12/1976 | Ponikelsky et al. |
| 4,014,400 A | | 3/1977 | Cline et al. |
| 4,142,642 A | | 3/1979 | Myers |
| 4,341,276 A | | 7/1982 | Furuichi |
| 4,394,913 A | * | 7/1983 | Lanning et al. ............. 212/304 |
| 4,469,186 A | | 9/1984 | Goodwine |
| 4,625,820 A | | 12/1986 | Christian |
| 4,640,421 A | * | 2/1987 | Mason ........................ 212/175 |
| 5,226,703 A | | 7/1993 | Norman |
| 5,823,279 A | | 10/1998 | Petzold |
| 6,158,535 A | | 12/2000 | Porubcansky et al. |
| 6,588,521 B1 | * | 7/2003 | Porubcansky et al. ....... 180/9.1 |

FOREIGN PATENT DOCUMENTS

| | | |
|---|---|---|
| DE | 37 425 | 4/1965 |
| DE | 3706931 | 9/1988 |
| SU | 581268 | 4/1974 |

* cited by examiner

*Primary Examiner*—Avraham Lerner
(74) *Attorney, Agent, or Firm*—King & Schickli, PLLC

(57) ABSTRACT

Disclosed are systems and related methods for mounting a ground-engaging motive device, such as a crawler track assembly, to a vehicle, such as a crane or the like, in either an extended or a retracted position. The systems and methods are adapted to ensure that proper alignment is reliably achieved between the mounting structures on the motive device and the corresponding mounting structures on the vehicle in both the extended and retracted positions. In one embodiment, the system and method are especially adapted for use in extending the crawler track assemblies on certain types of existing cranes without the need for extensive retrofitting.

27 Claims, 10 Drawing Sheets

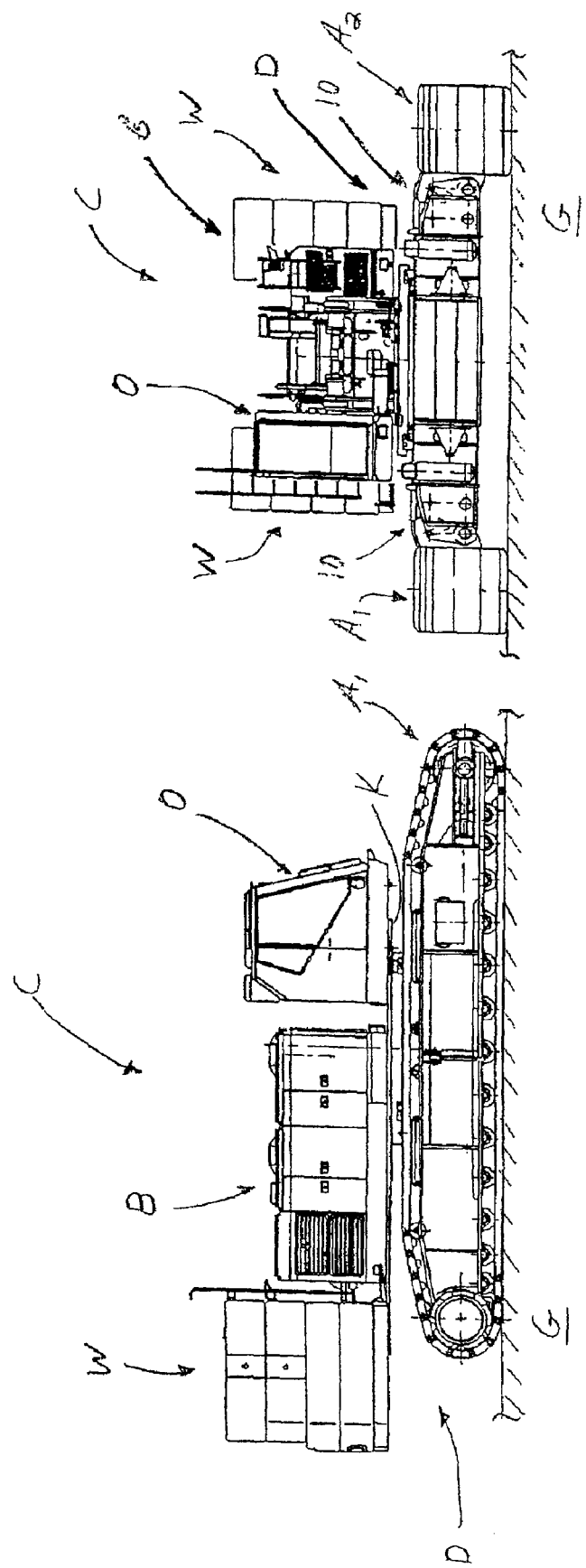

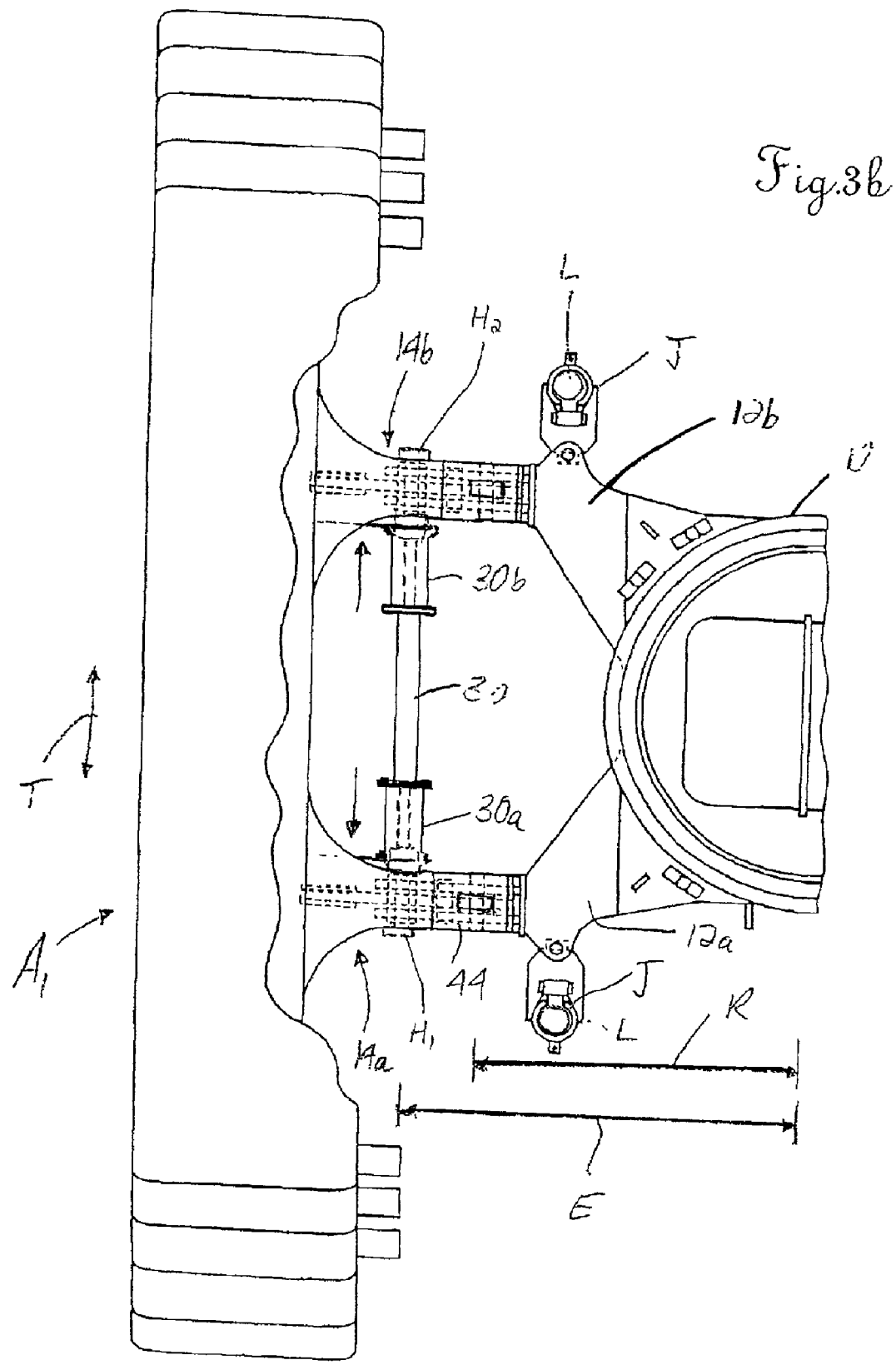

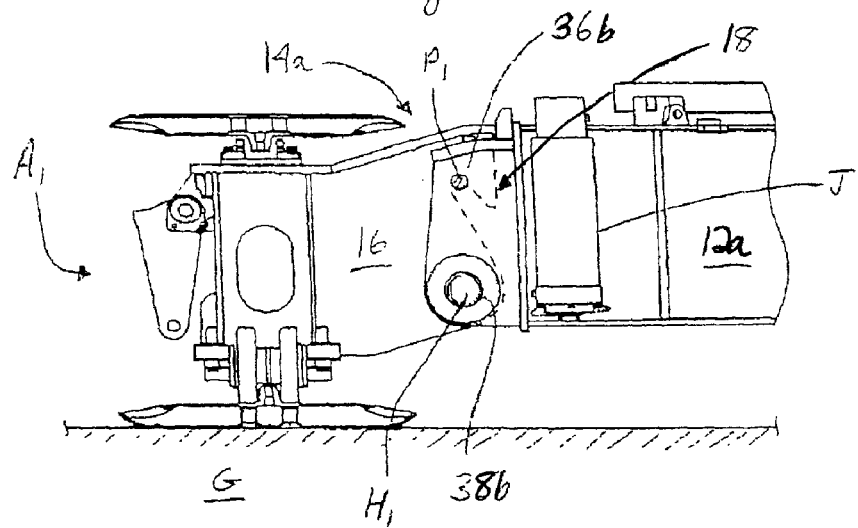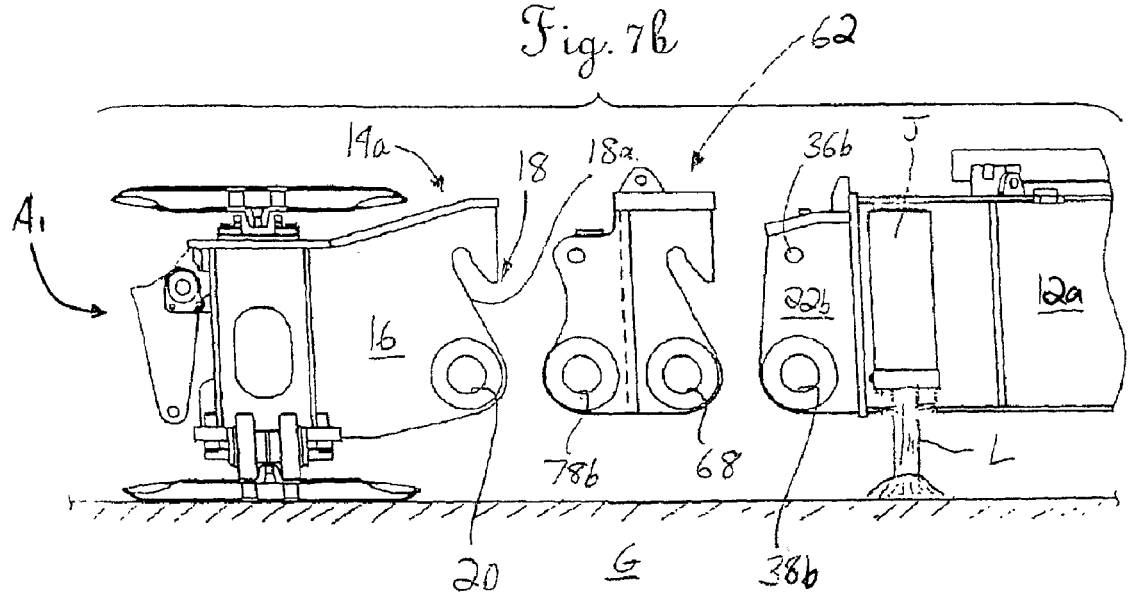

SYSTEMS FOR CONNECTING A GROUND-ENGAGING MOTIVE DEVICE TO A VEHICLE AND RELATED METHODS

TECHNICAL FIELD

The present invention relates generally to vehicles having one or more removable ground-engaging motive devices, such as crawler track assemblies and, more particularly, to systems and related methods for easily, efficiently and reliably connecting such a motive device to a vehicle in either an extended or a retracted position.

BACKGROUND OF THE INVENTION

Heavy duty, off-the-road vehicles utilize crawler tracks to provide better mobility on uneven ground and for improved traction. In the usual arrangement, the tracks comprise a plurality of links formed together in an endless chain-type fashion with pads formed on the links for engagement with the ground. The multiple pads along the lower run of the endless track in engagement with the ground at any one time provide exceptional traction, while the upper run serves to recirculate the track. Driven sprockets engage the inner surfaces of the links to drive the track along an endless path and thereby provide movement to the vehicle.

While crawler tracks are quite useful when the vehicle is moving about the job site in a traveling mode, they are not well-suited for use in over-the-road or highway travel. Consequently, the vehicle is normally transported on a tractor trailer from one site to the next. In many cases, over-the-road transport requires removing the entire assembly supporting and driving the crawler tracks from the vehicle to comply with governmental regulations on maximum vehicle width (and possibly placing them on a different tractor trailer altogether to comply with maximum weight restrictions). Since this operation is costly, a significant sought after advantage is of course the ability to complete it in a very short time such that the construction company can make the most efficient use of their capital equipment. In the past, this and other quick assembly type of features have been a particular focus for design of many types of vehicles, including not only light-to-medium duty cranes, but also heavy duty crawler cranes.

The present applicant has previously proposed a system allowing for the easy and efficient, yet secure attachment of crawler track assemblies to heavy-duty crawler cranes using a "hook and pin" type arrangement. In one version of this arrangement, a hook is provided on a first structure projecting from the crawler track assembly for engaging a transverse pin supported by a corresponding structure on the crane. The engagement between the hook and pin helps to ensure that proper alignment is achieved between a matching pair of apertures formed in the corresponding structures. A connector is then positioned in the aligned apertures to establish the connection between the crawler track assembly and the crane.

While this system has enjoyed considerable success from a commercial standpoint, one factor remains a particular hindrance. Specifically, in the past, there has typically been only a single mounting position available for the crawler track assemblies on such cranes. Hence, use of the crane at locations where space is limited, such as between buildings in an urban environment, has been a problem. Even in cases where space is not a concern, having the crawler tracks always mounted in a fixed position close to the vehicle is deleterious, since this reduces the moment arm and limits the loading capabilities. A comparable connection system with similar limitations in disclosed in U.S. Pat. No. 5,823,279 to Petzold, the disclosure of which is incorporated herein by reference.

In recent years there has been some development in making crawler tracks or like structures laterally adjustable. An early example is found in Caterpillar's U.S. Pat. No. 3,998,286 to Ponikelsky et al., which discloses an excavator with a pair of laterally extendable crawler track assemblies. While this arrangement allows for moving the crawler track assemblies between extended and retracted mounting positions and helps to ensure that proper alignment is achieved in both positions, it has several shortcomings. First of all, the upstanding pins serving as connectors are provided on the crawler tracks and are received in corresponding narrow-width slots in the carbody of the excavator. Consequently, in the case where the crawler track assemblies are removed, such as for over-the-road travel, reattachment requires positioning the crawler tracks in a very precise alignment relative to one another and then lowering the entire upper works of the excavator into place such that the pins are received directly in the narrow slots. Moreover, in view of the specific types of structures required and their special arrangement, it is observed that it is not easily retrofitted onto existing excavators or cranes, as a significant overhaul would be required. An earlier, similar proposal is found in Caterpillar's U.S. Pat. No. 3,899,038 to Griffith et al.

A second, more recent example is found in U.S. Pat. No. 4,341,276 to Furichi, which provides a system in which crawler tracks can be mounted in one position or another on a light-duty excavator. While this system seemingly solves the major problem with the approach disclosed in the '286 patent, there is need for improvement in the area of aligning the apertures for receiving the connectors, such as pins, in both the extended and retracted positions. Like the arrangement shown in the '286 patent, this connection system is also not readily adaptable for retrofitting onto existing vehicles without extensive drilling, welding, or other metalworking. A similar, but much earlier arrangement that generally suffers from the same shortcomings is found in U.S. Pat. No. 1,705,578 to Lichtenberg.

Accordingly, a need is identified for an improved manner of connecting one or more removable ground-engaging motive devices, such as crawler track assemblies or like wheeled structures, to a vehicle, such as a crane, excavator, or like lifting or moving device, so that a lateral position adjustment can be easily and efficiently made. Specifically, the arrangement provided would allow for the easy and efficient mounting of the motive device in at least two positions: one close to the body of the vehicle and one farther away from the body of the vehicle. In the case where the vehicle is a crane, the closer or retracted mounting position would allow for the use at locations where space is limited, while the second, extended position would improve the loading capabilities of the boom (especially when in traveling mode). The mounting arrangement would also be easy and inexpensive employed on certain existing vehicles having the hook and pin type of connection system without the need for extensive retrofitting. Overall, the systems and methods would result in a substantial improvement over the above-referenced proposals made by others.

SUMMARY OF THE INVENTION

In accordance with a first aspect of the invention, a system intended for use in at least partially connecting a removable ground-engaging motive device (such as a crawler track assembly) to a vehicle (such as a crane) in either an extended or a retracted mounting position using a plurality of connectors is disclosed. The system comprises a first stable mounting structure associated with one of the motive device or the vehicle. The first mounting structure is capable of supporting a first connector in a first position corresponding to the retracted position or supporting the first connector or another connector in a second position corresponding to the extended position. The first mounting structure further includes a first aperture for receiving a second connector in the retracted position and a second aperture for receiving the second connector in the extended position. A first linking structure is associated with the other of the motive device or the vehicle for engaging the first mounting structure in both the extended and retracted positions. The first linking structure includes a first receiver for receiving and guiding the first connector into place such that a third aperture formed in the first linking structure aligns and registers with the first aperture in the retracted position or receiving and guiding either the first connector or another connector mounted in the second position such that the third aperture aligns and registers with the second aperture. The guidance provided by the first receiver in aligning the third aperture with the first or second apertures facilitates connecting the motive device to the vehicle in both the extended and retracted positions.

In one embodiment, the first mounting structure is provided on the vehicle and the first linking structure is provided on the motive device. The vehicle may be a crane and the motive device a crawler track assembly. The first mounting structure may form part of a stub axle projecting from a carbody of the crane, in which case the first linking structure forms part of an arm projecting from the crawler track assembly transverse to a direction of crane travel.

The first linking structure may also include a fourth aperture for aligning and registering with the second aperture when the motive device is in the retracted position. A third connector may be positioned in the aligned second and fourth apertures.

The first stable mounting structure may include a pair of spaced plates having openings for slidably receiving the first connector. Preferably, the first connector is a pin generally aligned with a direction of vehicle travel. The first receiver includes an open-ended, specially contoured slot generally extending transversely to the direction of travel at an angle relative to a vertical plane and forming a hook-like projection. Consequently, when the linking structure including the hook-like projection is lowered between the spaced plates, the first receiver receives the pin and the contour of the slot guides the pin to a resting position.

The second connector may be manually inserted or withdrawn from the first or second and third apertures when aligned and registered in the retracted or extended positions, respectively. Alternatively, the second connector may comprise the head end of a hydraulic or pneumatic cylinder. In the latter case, the connector is inserted or withdrawn from the first or second and third apertures when aligned and registered by actuating the cylinder.

The first connector is preferably, but not necessarily positioned above the second connector in an operative position. The system may further include a stopper for positioning between a face of the first linking structure and an opposing face of the first mounting structure in the extended position. Specifically, the first mounting structure may include a pair of spaced plates having openings for receiving the first connector in the retracted position, in which case the stopper includes a depending portion having an opening that aligns and registers with the openings in the plates for receiving a third connector in the extended position.

In addition, the system may include a second stable mounting structure associated with one of the motive device or the vehicle. The second mounting structure supports a third connector and including a fifth aperture for receiving a fourth connector in the retracted position and a sixth aperture for receiving the fourth connector in the extended position. A second linking structure associated with the other of the motive device or the vehicle engages the second mounting structure. Specifically, the second linking structure includes a second receiver for receiving and guiding the third connector such that a seventh aperture formed in the second linking structure is in alignment and registered with the fifth aperture in the retracted position and in alignment and registered with the sixth aperture in the extended position.

Preferably, the first and second mounting structures are provided on the vehicle and the corresponding first and second linking structures are provided on the motive device. More preferably, the motive device is a first crawler track assembly and the system further includes a second crawler track assembly having third and fourth linking structures identical to the first and second linking structures. The third and fourth linking structures engage third and fourth stable mounting structures identical to the first and second mounting structures on a different side of the vehicle.

In a second embodiment, the first aperture is formed in and the first connector is supported by a portion of the first mounting structure associated with the vehicle in both the first and second positions, and the first mounting structure further comprises an extension component. The extension component includes the second aperture, a fourth aperture, and a second receiver for receiving and guiding the first connector such that the fourth aperture is in alignment and registers with the first aperture. A third connector is supported by the extension component, with the first receiver of the first linking structure receiving and guiding the third connector such that the second aperture formed in the extension component and part of the first stable mounting structure is in alignment and registered with the third aperture for receiving a fourth connector.

In accordance with a second aspect of the invention, a system intended for use in connecting at least one ground-engaging motive device, such as a crawler track assembly, to a vehicle, such as a crane, in either an extended or a retracted position using a plurality of connectors is disclosed. The system comprises a first stable mounting structure associated with one of the motive device or the vehicle, a first linking structure associated with the other of the motive device or the vehicle for engaging the first mounting structure in the retracted position, and an extension component for attachment to both the first mounting structure and the first linking structure to connect the motive device to the vehicle in the extended position.

In one embodiment, the first stable mounting structure is capable of receiving and supporting a first connector and includes a first aperture for receiving a second connector in the retracted position. The first linking structure includes a first receiver that receives and guides the first connector such that a second aperture in the first linking structure is in alignment and registered with the first aperture for receiving the second connector in the retracted position. The extension component includes a third aperture, a fourth aperture, and a second receiver for receiving and guiding the first connector such that the fourth aperture is in alignment and registers with the first aperture in the extended position. The extension component is capable of receiving and supporting a third connector and the first receiver receives and guides the third connector such that the second aperture is in alignment and registered with the third aperture for receiving a fourth connector in the extended position. The guidance provided by the first or second receiver in aligning the first, second, third, and fourth apertures facilitates insertion of the corresponding connectors and hence mounting of the motive device to the vehicle in both the extended and retracted positions.

In one embodiment, the extension component comprises a pair of spaced plates including a pair of aligned openings for receiving the third connector. The first linking structure includes a member in which the first receiver and the second aperture are formed. A first of the pair of spaced plates includes the third aperture, a second of the spaced plates includes a matching aperture, and the member in which the second aperture is formed is received between the plates. The fourth connector may extend through the third aperture, the matching aperture, and the second aperture when the three are aligned and registered to form a secure connection. The second receiver includes an open-ended, specially contoured slot generally extending transversely to a direction of vehicle travel at an angle relative to a vertical plane and forming a hook-like projection. The extension component including the hook-like projection is lowered between the spaced plates such that the second receiver receives the pin and the contour of the slot guides the pin to a resting position.

The first mounting structure may include a pair of spaced plates having aligned openings for receiving the first connector corresponding to the second receiver. In that case, the extension component includes a member in which the second receiver and the fourth aperture are formed. A first of the plates includes the first aperture, a second of the plates includes a matching aperture, and the member of the extension component is received in the space between the plates. The fourth connector extends through the first aperture, the matching aperture, and the fourth aperture when the three are aligned and registered to form a secure connection.

Preferably, the extension component includes a stopper for abutting with a face of the first mounting structure and an opposing face of the first linking structure in an operative position. The extension component may also include a receiver. The receiver is adapted for receiving a hook on the end of a hoisting line used for raising and lowering the extension component.

In accordance with a third aspect of the invention, a method intended for use in connecting a ground-engaging motive device, such as a crawler track assembly, to a vehicle, such as a crane, in either an extended or a retracted position using a plurality of connectors, is disclosed. The method comprises: (1) mounting the motive device in the retracted position by guiding a first connector supported in a first position by a mounting structure on one of the motive device or the vehicle into a receiver formed in a linking structure on the other of the motive device or the vehicle such that a first aperture on the linking structure aligns and registers with a second aperture on the mounting structure for receiving a second connector; (2) removing the receiver from the first connector; and (3) mounting the motive device in an extended position such that the first aperture aligns with a third aperture for receiving the second connector or another connector.

In one embodiment, the method further includes the step of inserting the second connector through the first and second apertures in the retracted position. Also, the third aperture may be provided on the mounting structure, in which case the method includes inserting the second connector through the first and third apertures in the extended position. The method may also include the step of moving the first connector to a second position corresponding to the extended position after removing the receiver from the first connector.

Alternatively, the third aperture may be provided on a separate extension component including a fourth aperture, a second receiver, and a third connector, in which case the method further comprises the steps of: (1) positioning the extension component such that the first connector is received and guided by the second receiver to align the second and fourth apertures; (2) positioning the motive device such that the third connector on the extension component is received and guided by the first receiver to align the first and third apertures; and (3) inserting the second connector through the first and third apertures and inserting a fourth connector through the second and fourth apertures.

In accordance with a fourth aspect of the invention, a method intended for use in connecting a crawler track assembly to a vehicle, such as a crane, in an extended position, is disclosed. The method comprises: (1) detaching the crawler track assembly from the vehicle; (2) attaching at least one extension component to one of the crawler track assembly or the vehicle; and (3) attaching the other of the crawler track assembly or the vehicle to the extension component.

In one embodiment, the extension component includes a first receiver and a first aperture, the vehicle includes a first connector and a second aperture, and the step of attaching the extension component includes: (1) attaching the extension component to the vehicle by lowering the first receiver over the first connector such that the first aperture aligns and registers with the second aperture; and (2) inserting a second connector between the aligned first and second apertures to complete the connection. In another embodiment, the motive device includes a second receiver and a third aperture, the extension component further includes a third connector and a fourth aperture, and the step of attaching the crawler track assembly includes: (1) lowering the second receiver over the third connector such that the third aperture aligns and registers with the fourth aperture; and (2) inserting a fourth connector between the aligned third and fourth apertures to complete the connection. Preferably, the vehicle is a crane including a carbody having a pair of stub axles projecting from each side thereof, and the method further includes the step of either attaching an extension component to each of the stub axles or attaching a single extension component to each pair of stub axles.

In accordance with a fifth aspect of the invention, a system for connecting a ground-engaging motive device to a vehicle is disclosed. The system comprises: (1) amounting structure associated with one of the vehicle or the motive device; (2) a linking structure associated with the other of the vehicle or the motive device; and (3) means for directly or indirectly connecting the mounting structure to the linking structure when the motive device is mounted in an extended or a retracted position. In one embodiment, the connecting means includes an extension component that is attached to the mounting structure at one end and to the linking structure at the other end.

BRIEF DESCRIPTION OF THE DRAWINGS

The accompanying drawings incorporated in and forming a part of the specification illustrate several aspects of the present invention and, together with the description, serve to explain the principles of the disclosed embodiments of the invention.

In the drawings:

FIG. 1 is a side elevational view of an exemplary vehicle, such as a crane, on which the present inventions may be practiced;

FIG. 2 is a front elevational view of the crane of FIG. 1 showing in particular the crawler track assemblies mounted in the retracted position;

FIG. 3b is a view similar to FIG. 3a, but showing the crawler track assembly mounted in an extended position in accordance with one embodiment of the present invention;

FIG. 7a is a partially cutaway side view showing the crawler track assembly mounted in the retracted position in accordance with a second embodiment of the present invention;

FIG. 7b is an assembly drawing providing a side view of the main components and structures used in practicing a preferred version of the second embodiment of the invention, including the extension component;

DETAILED DESCRIPTION OF THE INVENTION

Reference is now made to FIGS. 1 and 2, which show a vehicle in the form of a medium/heavy duty, mobile crawler crane C. As will be recognized, the crane C is generally shown as being assembled and includes a crane base unit (or upper/lower works) B. The base unit B comprises a chassis or carbody D carried on and supported above the ground G by motive devices, such as crawler track assemblies $A_1$, $A_2$ of a type generally known in the art. While the crawler track assemblies $A_1$, $A_2$ are shown on this particular mobile crane C, it is to be understood that the principles of the present invention would also apply to other types of ground-engaging motive devices used on other types of vehicles, including those adapted for direct over-the-road travel as well.

Although not shown in FIG. 1, the crane C typically includes a boom (typically a lattice boom) or other type of live mast, as more fully illustrated in commonly owned U.S. Pat. Nos. 6,131,750 and 5,240,129, the disclosures of which are incorporated herein by reference. An operators cab O in which the controls for operating the crane C are located is positioned on the deck K of the crane base unit B. Removable counterweights W are also supported at the rear of the deck K. Other component parts of a typical crawler crane C not shown in detail may include a gantry assembly and a rear power winch or drum. The details of the overall construction of such a heavy-duty crawler crane C and the booms used therewith are generally known in the art and, therefore, are not repeated herein.

Turning now to FIGS. 3a, 3b, and 4a–4d, one embodiment of the system 10 for connecting at least one of the crawler track assemblies, such as assembly $A_1$, is illustrated. With specific reference to the partially cutaway top view of FIG. 3a and the partially cutaway side view of FIG. 4a, it can be seen that the crane carbody D includes a pair of outwardly projecting stable mounting structures, such as stub axles 12a, 12b, to which the crawler track assembly $A_1$ is connected in a retracted position. Specifically, the crawler track assembly $A_1$ includes linking structures, such as arms 14a, 14b projecting outwardly in a direction transverse to the direction of crane travel (see action arrow T in FIG. 3a) at positions corresponding to the locations of the mounting structures or stub axles 12a, 12b on the carbody D. As described in more detail below, the linking structures or arms 14a, 14b correspond with and are positioned adjacent to the mounting structures or stub axles 12a, 12b in the operative position for receiving removable connectors.

Figure 3A:
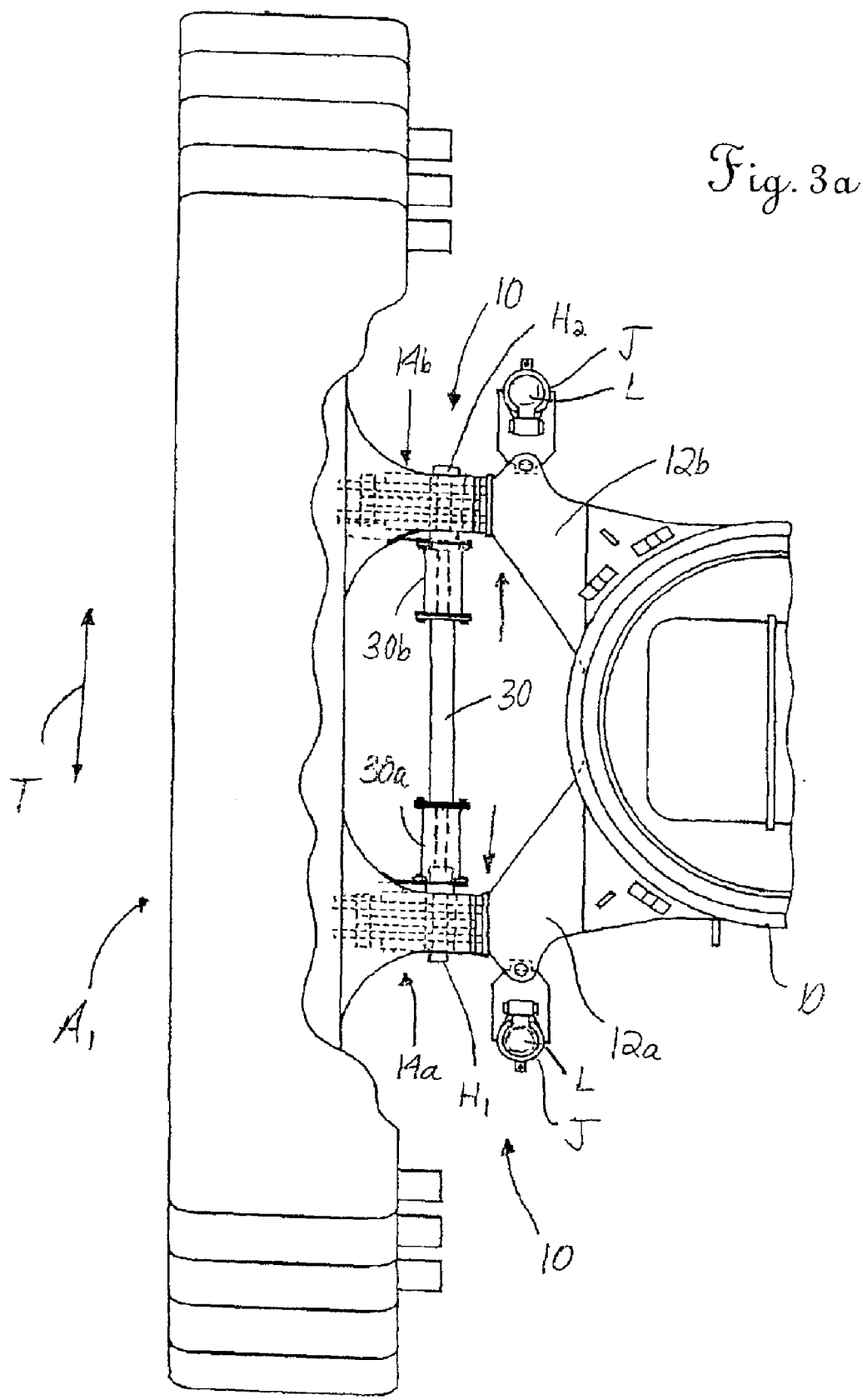
FIG. 3a is a partially cutaway top view of one side of the crane carbody with the crawler track assembly connected to the stub axles in a retracted position in accordance with one embodiment of the present invention.
Figure 4A:
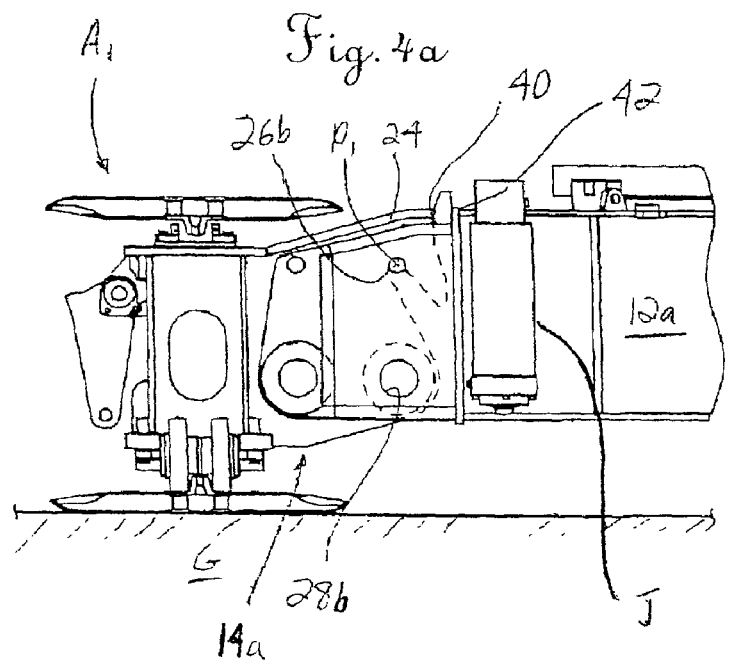
FIG. 4a is a partially cutaway side view showing the crawler track assembly mounted in the retracted position in accordance with one embodiment of the present invention.
Figure 4B:
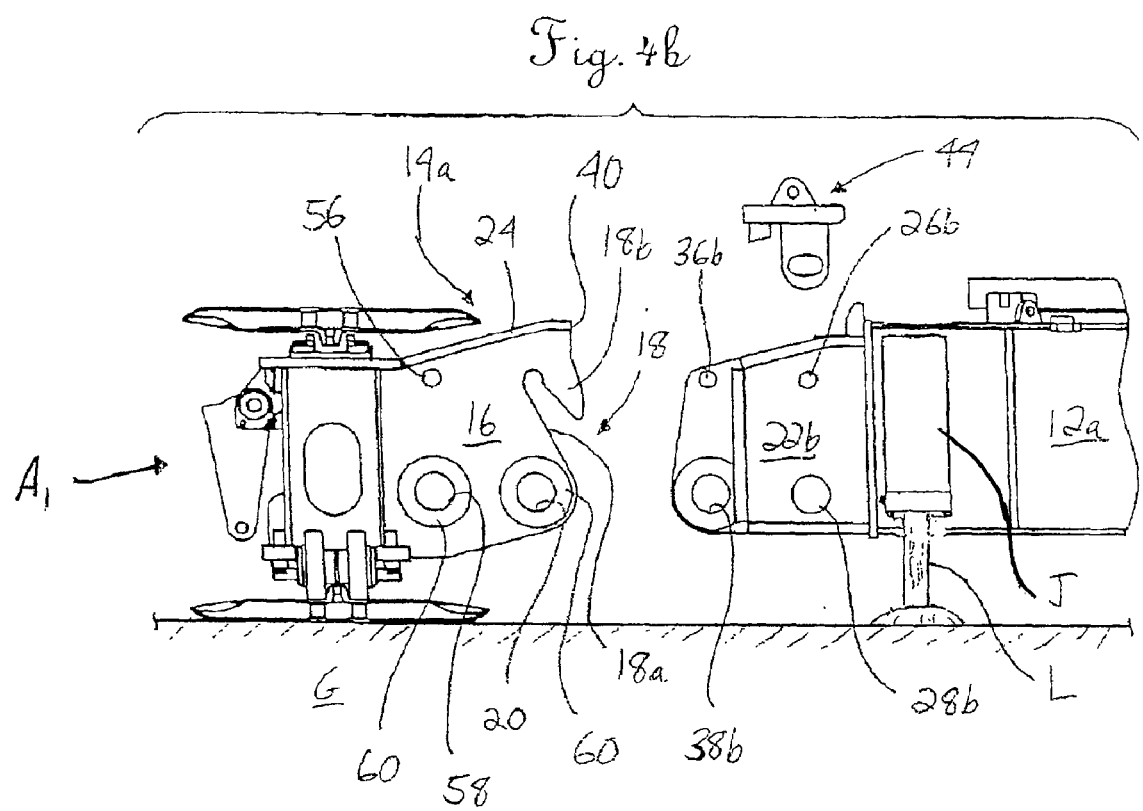
FIG. 4b is a partially cutaway assembly drawing providing a side view of the components and structures used in practicing a preferred version of one embodiment of the invention.

As perhaps best shown in FIG. 4b, arm 14a includes a plate or plate-like member 16. This plate 16 includes a receiver 18 having an open-ended slot 18a defining a hook-like projection 18b and an aperture 20. As described further below, the plate 16 is preferably mounted in an upstanding fashion and sized and shaped for being received between a pair of spaced plates 22a, 22b forming a part of the mounting structure or stub axle 12a (see FIG. 4c). To add strength to the arms 14a, 14b, a cover member or cross plate 24 may be attached to the upper end of the plate 16. This cross plate 24 directly overlies the spaced plates 22a, 22b when the crawler track assembly $A_1$ is in the retracted position, as shown in FIGS. 3a and 4a. Thus, the arm 14a generally has a T-shaped cross-section.

Figure 4C:
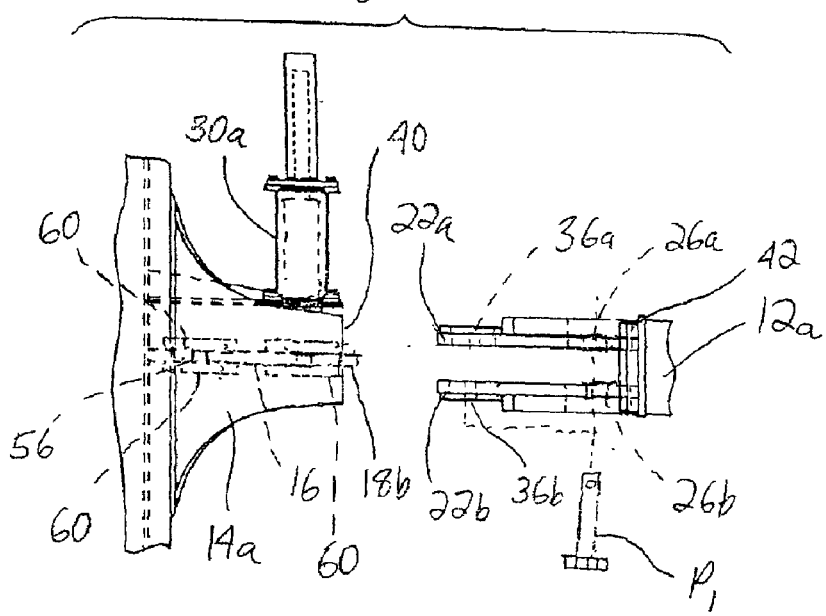
FIG. 4c is a partially cutaway assembly drawing providing a top view of the components and structures used in practicing one preferred version of one embodiment of the invention.

Turning back to the stub axle 12a, and with specific reference to FIGS. 4a and 4c, the pair of spaced plates 22a, 22b include first and second pairs of aligned, matching apertures 26a, 26b; 28a, 28b, respectively. The first or upper apertures 26a, 26b are both sized and shaped for slidably receiving a first transversely extending connector, such as a pin $P_1$ (see FIG. 4c) and, thus, form a first mounting position corresponding to the retracted position of the crawler track assembly $A_1$. As can be seen from FIG. 4a, apertures 26a, 26b are generally positioned along the same vertically extending centerline as apertures 28a, 28b. The pin $P_1$ is shown as including an oversized head at one end. The opposite end includes a transverse opening or passage for receiving a quick-release fastener, such as a cotter pin, for locking the pin $P_1$ in place when inserted through the apertures 26a, 26b. Instead, the pin $P_1$ may be permanently or semi-permanently fixed to the mounting structure/stub axle 12a, such as by welding or any other secure form of mechanical bond or form of attachment (e.g., a threaded nut). With the exception of FIG. 4c, the pin $P_1$ is generally shown without its head in the other drawing figures for purposes of clarity.

To form the connection, the crawler track assembly $A_1$ is lifted and lowered into place such that plate 16 is between plates 22a, 22b. As lowering is completed, the slot 18a forming a part of the receiver 18 not only receives the pin $P_1$, but also provides a guiding function. Specifically, and as perhaps best understood with reference to FIG. 4b, the slot 18a is specially contoured to extend at an angle relative to the vertical plane and in a direction both transverse to the direction of crane travel and away from the carbody D. Consequently, when the underside surface of the hook-like portion 18b engages the pin $P_1$, a guiding function is provided that urges the crawler track assembly $A_1$ toward the crane carbody D (which as illustrated, may be supported by the extended legs L of on-board jacking cylinders J before the connections are established). The pin $P_1$ eventually "bottoms out" in the upper extent of the receiver 18, at which point the aperture 20 in the arm 14a or linking structure is in perfect alignment and registered with the aligned apertures 28a, 28b in the plates 22a, 22b.

As an aside, in the case where the crane carbody D is provided with two mounting structures or stub axles 12a, 12b and the crawler track assembly $A_1$ includes two linking structures or arms 14a, 14b, it should be appreciated that the exact same type of arrangement may be used with axle 12b and arm 14b. Consequently, the connections between stub axles 12a, 12b and arms 14a, 14b may be partially established during a single lowering operation. As described further below, the same arrangement of structures may be provided on the opposite side of the crane C (in which case the arrangements would essentially be mirror images of FIGS. 3a and 3b).

Once the apertures 20, 28a, 28b are aligned and registered, a connector is then positioned through them to complete the connection. While it is possible to establish the full connection by manually inserting a separate connector, such as a pin, through the aligned apertures 20, 28a, 28b, a hydraulic pin "puller" 30 is used for this purpose in the preferred embodiment. Specifically, as perhaps best shown in FIGS. 3a and 4c, a double-headed or double-acting pin puller 30 is provided that includes a pair of opposed fluid-activated (pneumatic or hydraulic) cylinders 30a, 30b generally aligned with a direction of travel of the crane C (see action arrow T). Consequently, as perhaps best shown in FIG. 3a, when the cylinders 30a, 30b are actuated, the head ends $H_1$, $H_2$ extend through the aligned apertures 20, 28a, 28b, as well as through the aligned apertures (not numbered) of the stub axle 12b and arm 14b. Thus, the head ends $H_1$, $H_2$ function as "secondary" connectors (the pin $P_1$ being considered the primary or first connector in this embodiment). The pressurized fluid required for actuating the cylinders 30a, 30b may be provided by a take off from the main hydraulic system of the crane C, which is also typically used to drive the sprockets (not numbered) at the ends of the crawler track assembly $A_1$ or $A_2$. Various types of pin pullers that will work in the present system 10 and in practicing the related method are generally well known in the art, as described in the above-referenced '279 patent and as shown in U.S. Pat. No. 4,469,186 to Goodwine, the disclosure of which is herein incorporated by reference.

With reference to FIGS. 3a and 3b, pin puller 30 is shown as being positioned between the arms 14a, 14b and secured directly to the crawler track assembly $A_1$. This arrangement is preferred, since the weight of the puller 30 is associated with a removable component, rather than the carbody D or crane base unit B. This may eliminate the need for further disassembly in the case where the base unit B is otherwise at or near the maximum weight limit for over-the-road transport. Alternatively, the puller 30 could also be mounted directly to the carbody D, such as between stub axles 12a, 12b. However, as will be understood after reviewing the description that follows, this alternative approach somewhat complicates matters, since either the first pin puller 30 must be moved or other connectors (pins, separate pin pullers, or a second double-acting pin puller) are required for completing the connection when the crawler track assembly $A_1$ is in an extended position.

As noted above, a similar connection system 10 may be provided on the opposite side of the crane C to connect the second crawler track assembly $A_2$. When the connection is complete on both sides, the jacking cylinders J may of course be depressurized to retract the legs L and place the crane C in a working or traveling mode. As described further below, disconnecting the crawler track assemblies $A_1$, $A_2$ from the retracted positions, such as for maintenance, replacement or before over-the-road travel, generally involves following the foregoing steps in a reverse sequence.

As a result of this type of connection system 10 (which may also be considered as two subsystems, one for use on each side of the crane, or four separate subsystems, one for use on each stub axle), a secure connection is easily established in a matter of minutes. The receiver 18 also provides reliable guidance by receiving and engaging the first connecting pin $P_1$, which ensures that the apertures 20, 28a, 28b are automatically aligned and registered. The use of a double-acting or double-headed hydraulic pin puller 30, while optional, also facilitates completing the connection of the crawler track assembly $A_1$ to the crane carbody D. Overall, this connection system 10 is exceptionally easy to use and an improvement over the past proposals by others noted above in terms of efficiency, reliability, and overall operational cost.

Figure 4D:
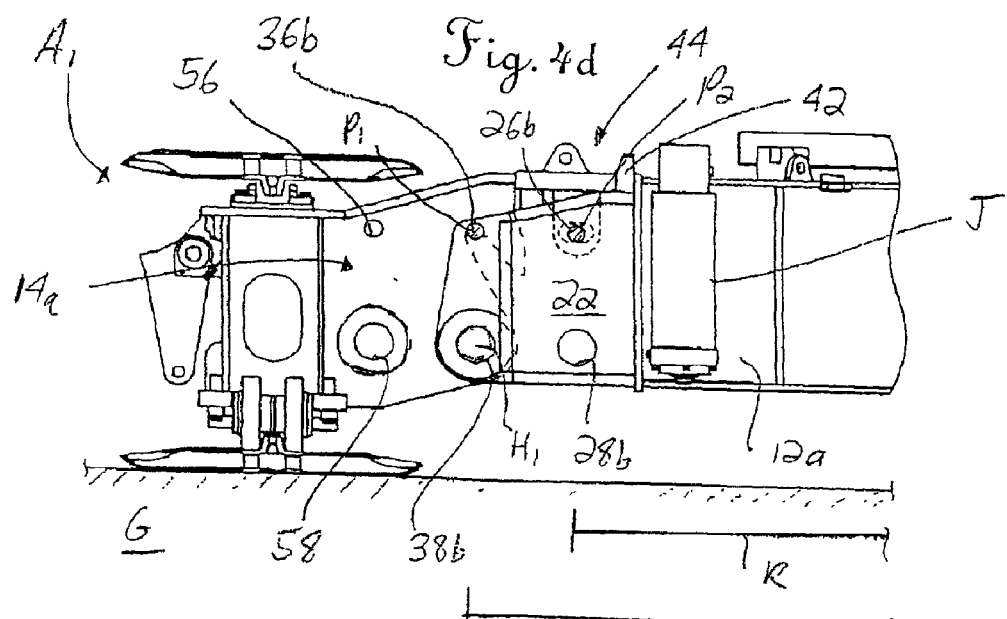
FIG. 4d is a partially cutaway side view showing the crawler track assembly mounted in the extended position in accordance with one embodiment of the present invention.

In accordance with one aspect of the present invention, the connection system 10 and related method include a feature that also allows for the easy and efficient mounting of the crawler track assembly $A_1$ at an extended position, as indicated by reference character E in FIGS. 3b and 4d and contrasted with reference character R representing a retracted position. Specifically, with reference to FIGS. 3b, 4b, and 4d in general, and specifically focusing on FIG. 4b, the spaced plates 22a, 22b forming a part of the mounting structure or stub axle 22b also include a first or upper pair of aligned apertures 36a, 36b and a second lower pair of aligned apertures 38a, 38b. The upper apertures 36a, 36b are sized and shaped for receiving a removable connector and, thus, create a second mounting position corresponding to the extended position of the crawler track assembly $A_1$. The connector may be pin $P_1$, if it is easily removable from apertures 26a, 26b, or a different pin altogether. For purposes of illustration, the system 10 is shown as including a removable pin $P_1$ that is slidably inserted through apertures 36a, 36b.

To extend the crawler track assembly $A_1$ in the case where it is mounted in the retracted position, the legs L of the jacking cylinders J are first extended (see leg L in FIG. 4b) and the second connectors, such as the head ends $H_1$, $H_2$ of the pin puller 30, are then withdrawn. The crawler track assembly $A_1$ is then lifted, such as by using the crane C itself, if equipped for self-assembly (see, e.g., commonly owned pending U.S. patent application Ser. No. 09/272,115 and the patent documents cited therein), an attendant crane, or other lifting device. As should be appreciated, each receiver 18 present also provides a guiding function as the pins $P_1$ move along the slots, such as slot 18a, until the arms 14a, 14b are clear of the stub axles 12a, 12b. The crawler track assembly $A_1$ may then be placed on the ground G next to the crane C, as depicted in FIG. 4b.

In the case where pin $P_1$ is removable, it may then be withdrawn from the first position between apertures 26a, 26b corresponding to the retracted position, inserted through apertures 36a, 36b defining the second position corresponding to the extended mounting position, and locked in place using a cotter pin or the like. The crawler track assembly $A_1$ is then moved into place, such as by first raising it and then lowering it. Specifically, with respect to the interface at stub axle 12a and arm 14a, lowering is completed such that plate 16 including hook-like portion 18b is positioned between plates 22a, 22b. The positioning is such that the pin $P_1$, now in the second mounting position, is received and guided by the slot 18a of receiver 18 until it reaches the seated position. As described above, as a result of the contour of the slot 18a and the specific guidance it provides during lowering, the aperture 20 automatically aligns and registers with both apertures 36a, 36b. The connection process may then be completed by manually inserting a removable secondary connector, such as an appropriately sized and shaped pin (not shown) through aligned apertures 20, 38a, 38b. Alternatively, in the case where pin puller 30 is present, the hydraulic cylinders 30a, 30b are separately or simultaneously actuated such that the head ends $H_1$, $H_2$ extend through the aligned apertures (such as in the case of cylinder 30a, apertures 20, 38a, 38b) and form a secure, secondary connection.

With reference now to FIG. 4a, it should be appreciated that the cover member or top plate 24 overlies the plates 22a, 22b when the crawler track assembly $A_1$ is in the retracted mounting position. This plate 24 includes a face 40 that, when the crawler track assembly $A_1$ is in the retracted position, is immediately adjacent to or in contact with an abutment member 42 on the mounting structure or stub axle 12a. Although optional, this contact or engagement is desirable, since it tends to reduce any tendency for skewing or canting, especially as the crawler track assembly $A_1$ is moved into position prior to being fully connected to the mounting structures on the crane carbody D.

Figure 5A:
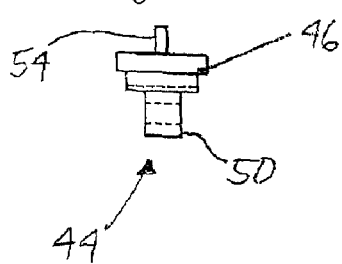
FIGS. 5a, 5b, and 5c are front, side, and top views of the stopper for use in one embodiment of the present invention.
Figure 5B:
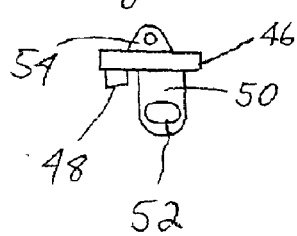
Figure 5C:
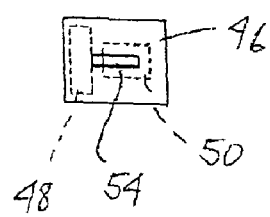

It can be appreciated that this engagement is lacking when the crawler track assembly Al is mounted in the extended position, since the plate 24 is spaced from the abutment member 42. To nevertheless create this same type of engagement, a stopper 44 may optionally be placed in the space created when the crawler track assembly $A_1$ is in this position. Specifically, as shown in FIGS. 5a–5c, the stopper 44 may comprise a plate 46 having a first depending member 48 for resting atop the spaced plates 22a, 22b and a second depending member 50 for projecting between them. In the most preferred embodiment, the underside of the first member 48 is tapered to correspond to the slope of the upper surface of the plates 22a, 22b (which of course is a completely optional feature). The second depending member 48 includes a strategically positioned opening 52 that aligns with the apertures 26a, 26b formed in the plates 22a, 22b in the operative position. Hence, as shown in FIG. 4d, a connector such as a pin $P_2$ similar to or substantially identical to pin $P_1$, may be inserted through the aligned and registered apertures 26a, 26b and opening 52 and locked into place to capture the stopper 44 securely in position during operation of the crane C. As a consequence, the front face or end of the plate 46 creates an abutment surface for the face 40 of the plates 16, 24 forming the arm 14a, while the rear face or end of this plate 46 is closely spaced from or in engagement with the abutment member 42.

As perhaps best shown in FIG. 5b, the opening 52 in the stopper 44 is preferably oversized. This is done to accommodate slight variations resulting from wear, tolerances, mounting conditions, or the like. A receiver 54 is also provided for receiving a hook or like connector carried by a hoisting line, such as a wire rope, for lifting the stopper 44. As should be appreciated, this line or rope may be used to raise the stopper 44 from the ground or a transport trailer and lower it into the operative position.

Another preferred, but completely optional feature is to provide an extra pair of first (upper) and second (lower) apertures 56, 58 on arm 14a. When the crawler track assembly $A_1$ is thus in the retracted position, these secondary apertures 56, 58 align and register with the apertures 36a, 36b and 38a, 38b formed in the mounting structure or stub axle 12a. Connectors (not shown) may optionally be placed in these aligned and registered apertures 56, 36a, 36b and 58, 38a, 38b, primarily as a precaution and to provide an extra measure of security. As with the arrangement described above, the connectors may be in the form of pins corresponding in size to the apertures and capable of being manually inserted. Instead, in combination with a pin for insertion through apertures 56, 36a, and 36b, a second hydraulic pin puller (not shown) could be mounted to the crawler track assembly $A_1$ in alignment with the lower aperture 58 such that the head end (not shown) forms the secondary connection when extended. The same arrangement could of course be provided at the interface between stub axle 12b and arm 14b (and the arms (not shown) of the second crawler track assembly $A_2$).

Yet another optional feature, but one that also serves to enhance ease of alignment and stability, is to provide an outwardly projecting raised portion or ring 60 on both sides of plate 16 around at least apertures 38a, 38b and 58 (see, e.g., FIG. 4c). When the crawler track assembly $A_1$ is in the mounted position, rings 60 are in abutment with the inner surfaces of plates 22a, 22b and, thus, reduce any tendency for misalignment or side-to-side movement. Moreover, the rings 60 slidably engage these inner surfaces as the crawler track assembly $A_1$ is raised or lowered. Fabrication of these rings 60 in the sides of the plates 16, 22a, 22b may be accomplished by molding, welding, or any other well known metal working techniques. The rings 60 are also desirable from the standpoint that a reduction in weight and savings in materials may result, as compared to the case where the entire side surfaces of the plates 16, 22a, 22b are flush with one another (which of course would also make interleaving plate 16 between plates 22a, 22b more difficult).

It should also be appreciated that, by positioning pin $P_1$ or a different pin in apertures 36a, 36b at the outset, the crawler track assembly $A_1$ may initially be mounted in the extended position. In other words, after the crane carbody D is transported to the work site, unloaded from any transport vehicle/tractor trailer, and supported above the ground by the legs L of the jacking cylinders J, the crawler track assembly $A_1$ may be lowered over the pin $P_1$ in the second position. The same is true for the crawler track assembly $A_2$ mounted on the opposite side of the crane C.

As should be appreciated, to move the crawler track assembly $A_1$ from the extended to the retracted position, the basic procedures described immediately above are followed in reverse order. Specifically, once the secondary connectors, such as the head ends $H_1$, $H_2$ of cylinders 30a, 30b, are withdrawn and the crawler track assembly $A_1$ is lifted clear, pin $P_1$ or a different connecter is removed from the second position corresponding to the extended position. If necessary, the pin $P_1$ or another connector is then placed in the first position, the crawler track assembly $A_1$ is lowered into place in the retracted position, and the secondary connection is completed as previously described.

Figure 6A:
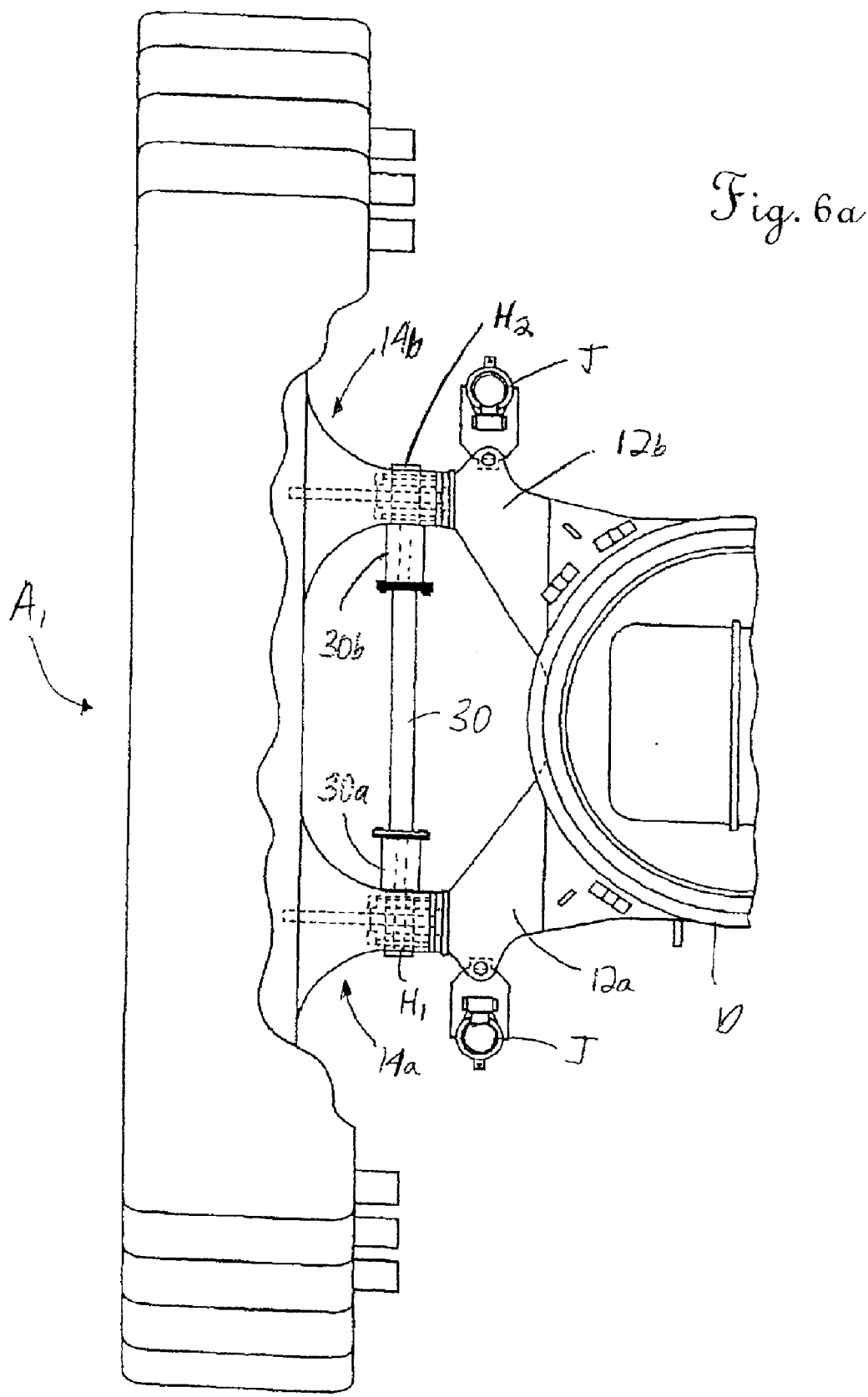
FIG. 6a is a partially cutaway top view of one side of the crane carbody with the crawler track assembly connected to the stub axles in a retracted position in accordance with a second embodiment of the present invention.
Figure 6B:
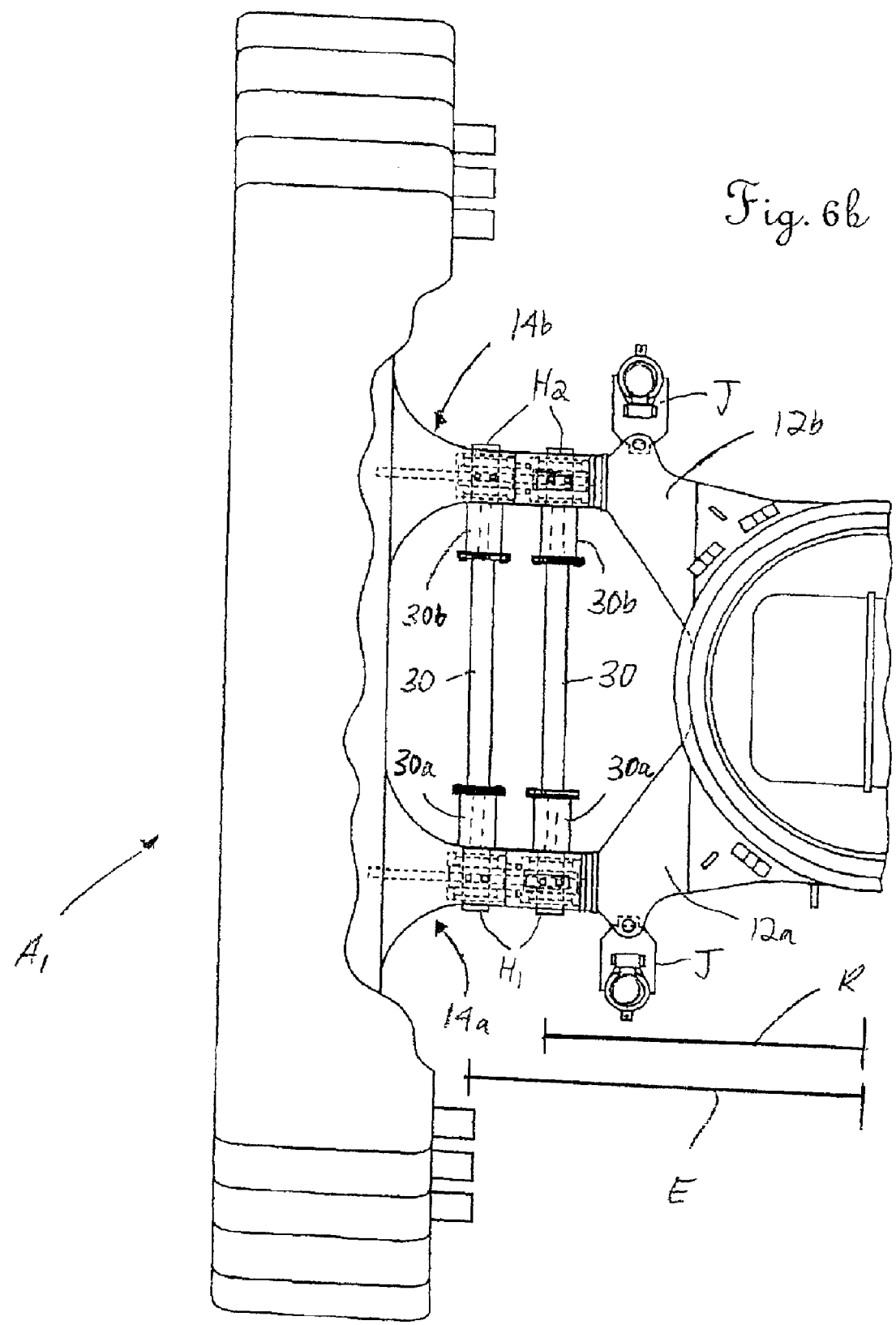
FIG. 6b is a view similar to FIG. 6a, but showing the crawler track assembly mounted in an extended position in accordance with the second embodiment of the present invention.

With reference now to FIGS. 6a–8d and with like components labeled as above, a second, alternative embodiment of the system 10 and related method is described. This embodiment is especially adapted for use with existing cranes including the "hook and pin" type of connection system previously described or like systems, such as the one shown in the '279 patent. Turning first to FIGS. 6a and 7b, the crawler track assembly $A_1$ mounted in the retracted position is depicted, substantially as shown in FIG. 4a, but with a few exceptions. In particular, the mounting structure or stub axle 12a includes a pair of spaced plates 22a, 22b, as is shown in FIG. 4c, but instead of having four pairs of aligned apertures formed therein, only a first or upper pair of apertures 36a, 36b and a second or lower pair of apertures 38a, 38b are provided. The arm 14a forming part of the linking structure on the crawler track assembly $A_1$ includes a first receiver 18, just as above, but only a single aperture 20 is formed in plate 16.

Despite these differences, it should be appreciated that, using the system 10 of this second embodiment and the related method, the connection between the crawler track assembly $A_1$ and the crane carbody D in the retracted position may be formed precisely as described with respect to the first embodiment. Specifically, the crawler track assembly $A_1$ is lowered into place such that receiver 18 receives and guides a connector, such as pin $P_1$, positioned in apertures 36a, 36b or otherwise supported by the stub axle 12a. The slot 18a forming a part of the receiver 18 guides the pin $P_1$ such that aperture 20 is in alignment with apertures 38a, 38b. A connector, such as the corresponding head end $H_1$ of the cylinder 30a forming part of an adjacent pin puller 30, is then inserted between the aligned and registered apertures to form a secure connection (see FIG. 7a).

Unlike in the first embodiment, mounting the crawler track assembly $A_1$ in the extended position in this second embodiment requires the use of a separate extension component 62. Referring together now to FIGS. 7b and 8a–8d, the extension component 62 at one end includes a generally upstanding plate 64 or plate-like member having a receiver 66 and an aperture 68. The receiver 66 and aperture 68 may be substantially identical to receiver 18 and aperture 20 on the plate 16 forming a part of the linking structure 14a. Thus, the receiver 66 includes a specially contoured slot 66a for receiving and guiding a connector into a seated position, as described further below. The slot 66a also defines a hook-like portion 66b of the plate 64.

In the illustrated embodiment, a top or cover plate 70 is attached to the upper end of the upstanding plate 64. The upper ends of a pair of opposed, upstanding plates 72a, 72b are also secured to the opposite end of this cover plate 70 and depend therefrom. A cross member 74 positioned so as to not interfere with the connection also helps to secures the plates 72a, 72b to each other. These plates 72a, 72b are similar in design to plates 22a, 22b and, thus, include a first or upper pair of aligned apertures 76a, 76b and a second or lower pair of aligned apertures 78a, 78b. A receiver 80 is also secured to the upper surface of the cover plate 70. The receiver 80 is preferably positioned in alignment with the center of gravity of component 62 and includes an aperture for receiving a hook (not shown) coupled to a wire rope or a similar type of hoisting line that may be used to lift and lower it into place.

Figure 7C:
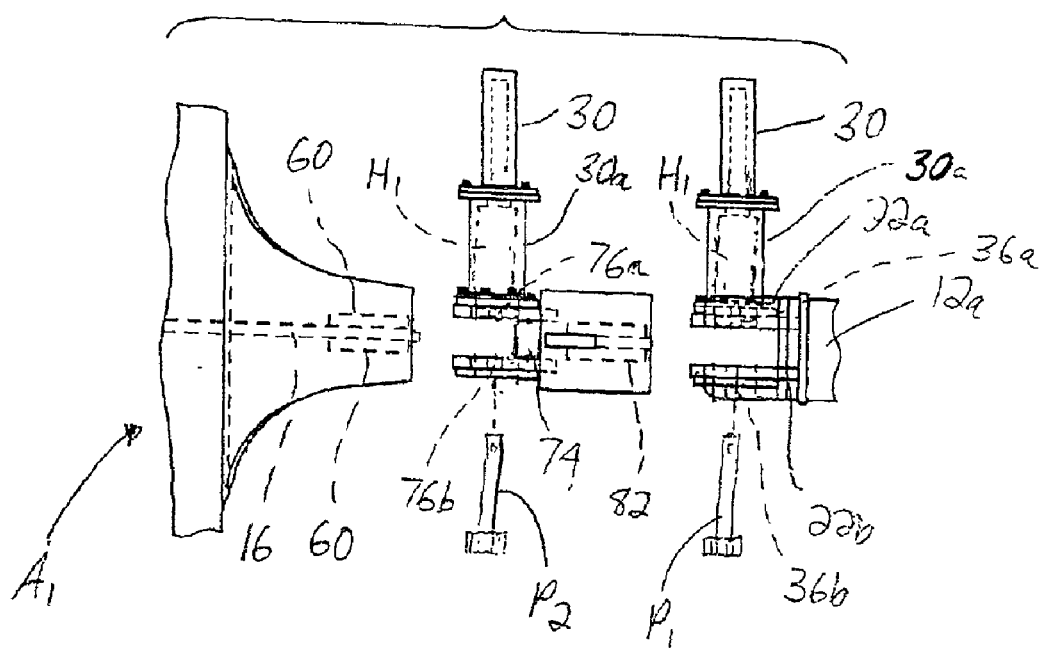
FIG. 7c is a partially cutaway assembly drawing providing a top view of the components and structures used in practicing one preferred version of the second embodiment of the invention.
Figure 7D:
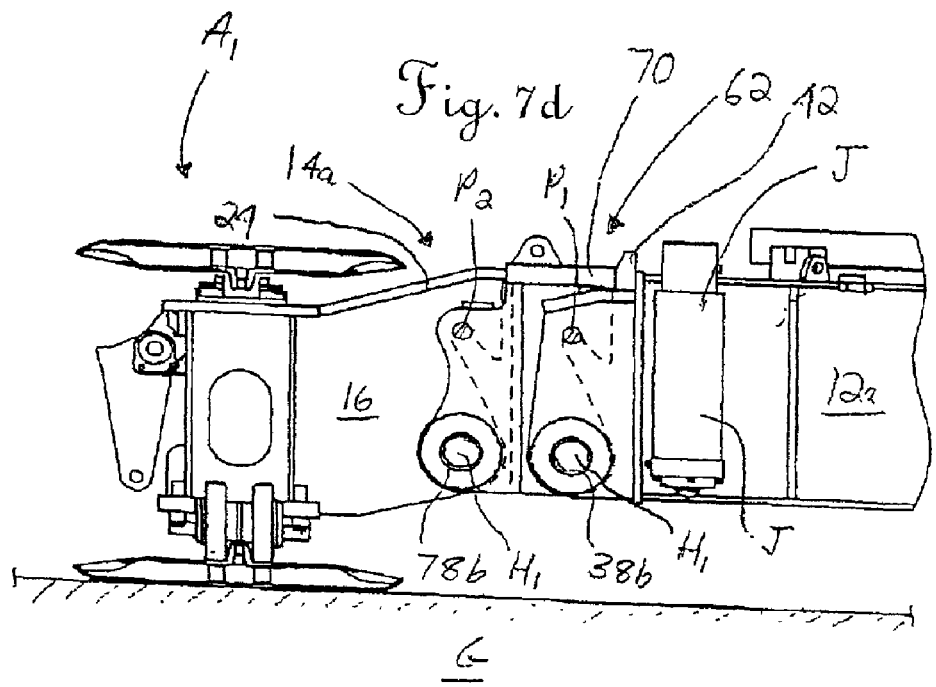
FIG. 7d is a partially cutaway side view showing the crawler track assembly mounted in the extended position in accordance with the second embodiment of the present invention.

Turning now to FIGS. 7b, 7c, 7d, the use of the extension component 62 is now described in detail. FIG. 7b shows the crawler track assembly $A_1$ positioned apart from the crane carbody D and, in particular, stub axle 12a, such as before it is connected in the extended position or after it has been in the retracted position and previously disconnected. As described above, a connector, such as pin $P_1$, is supported by the mounting structure at the end of the stub axle 12a, such as by inserting it through the aligned upper pair of apertures 36a, 36b. Alternatively, the connector may be permanently fixed to the stub axle 12a.

In either case, the extension component 62 is then lowered into place using the crane C itself, an attendant crane (not shown), or other lifting device such that: (1) the plate 64 on the extension component is between plates 22a, 22b forming apart of the mounting structure or stub axle 12a; and (2) slot 66a forming a part of the second receiver 66 receives and guides the connector/pin $P_1$ to a seated position. As perhaps best understood with reference to the completed assembly shown in FIG. 7d, the aperture 68 is aligned and registers with the apertures 38a, 38b formed in plates 22a, 22b as a consequence of the guiding function provided by the slot 66a. A secondary connector is then inserted through the aligned and registered apertures 38a, 38b, 68 to complete the connection of the extension component 62 to the stub axle 12a and hence the crane carbody D.

As noted above, the secondary connector may be a manually inserted pin, similar to pin $P_1$ but sized to correspond to apertures 38a, 38b, 68. Instead, a hydraulic pin puller 30 may be used. In the illustrated embodiment, a first pin puller 30 is shown as being mounted to the inside surface of plate 22a forming a part of the mounting structure on the stub axle 12a. The mounting is such that, when the adjacent cylinder 30a is actuated, its head end $H_1$ extends through the apertures 38a, 38b, 68 to complete the connection. In the case where the identical arrangement is provided on the other stub axle 12b on this side of the crane carbody D, the puller 30 may be double-acting such that a cylinder 30b is also positioned adjacent to and alignment with the apertures (not numbered) formed in the corresponding structures to complete the connection of the crawler track assembly $A_1$ (see, e.g., FIG. 6b).

Once the extension component 62 is in place, the crawler track assembly $A_1$ is connected to the free or outwardly projecting end thereof Specifically, as shown in FIG. 7d, connector, such as pin $P_2$ (which may be similar or identical to pin $P_1$ and thus interchangeable therewith), is supported at the opposite end of the component 62, such as between apertures 76a, 76b. The connector or pin $P_2$ may be a permanent fixture, or may be removably secured in place and capable of being quickly released using a removable fastener, such as a cotter pin (not shown). In any case, the crawler track assembly $A_1$ is then lowered such that plate 16 forming part of the linking structure or arm 14a is positioned between the opposed pair of plates 72a, 72b of the extension component 62, with the slot 18a of the first receiver 18 receiving and guiding the connector or pin $P_2$ such that aperture 20 aligns and registers with apertures 78a, 78b.

Once these apertures 20, 78a, 78b are aligned and registered, a secondary connector is inserted through them to complete the connection. As with all cases above, the connector may be a removable pin similar to pins $P_1$ and $P_2$, but sized accordingly, that is manually inserted and removed from these aligned and registered apertures 20, 78a, 78b. Alternatively, and as shown in the illustrated embodiment, the secondary connector may comprise the head end $H_1$ of a hydraulic cylinder 30a forming part of a pin puller 30. The cylinder 30a is mounted adjacent to and aligned with the apertures 20, 78a, 78b such that, upon actuation, the connection is established by the head end $H_1$. A similar arrangement is preferably provided at the other locations where the secondary connection is to be completed.

As should now be appreciated, this second embodiment provides similar advantages to the first embodiment, in that it allows for a crawler track assembly $A_1$ to be easily, efficiently, and reliably connected to a crane C in both an extended position and a retracted position. This second embodiment is also especially adapted for use in a retrofitting situation, such as where the crane C and crawler track assemblies $A_1$, $A_2$ already include the "hook and pin" type of connection system shown in FIG. 7a or a similar type of system where a pin engages a receiver to cause matching apertures to align and register. As should be appreciated, in this situation, no significant modification or excessive metalworking is required, since the extension component 62 may be fully adapted for engaging the existing mounting and linking structures on the crawler track assembly $A_1$ and the crane carbody D, respectively.

In the first embodiment, a pin puller 30 is shown as being mounted on or between the arms 14a, 14b projecting from the crawler track assembly $A_1$. This type of mounting is of course possible in this second embodiment for establishing the connection between the crawler track assembly $A_1$ and the corresponding end of the extension component 62. However, as perhaps best understood with reference to FIGS. 6b and 7c, the "second" pin puller 30 for establishing the connection with the crawler track assembly $A_1$ itself in the extended position may optionally be connected directly to the extension component 62. This provides the advantage of allowing the extension component 62 and cylinder 30a to be formed as a single assembly. Moreover, in the case of a double-acting pin puller 30, an extension component 62 may be coupled to each end to form a single assembly (not shown) that is merely lowered into place to simultaneously form the primary connections with stub axles 12a, 12b.

As should be appreciated, to move the crawler track assembly $A_1$ from the extended to the retracted position, the basic procedures described immediately above are followed in reverse order. Specifically, once the secondary connectors, such as the head ends $H_1$, $H_2$ of cylinders 30a, 30b, are withdrawn and the crawler track assembly $A_1$ is lifted clear. The extension component 62 is then released in a similar fashion and lifted from the mounted position. The crawler track assembly $A_1$ is lowered into place in the retracted position, and the secondary connection is completed as previously described.

From FIG. 7d, it should also be appreciated that, when the extension component 62 is in the operative position, the top or cover plate 70 contacts the face 40 of the plate 24 at one end and engages the abutment member 42 at the opposite end. Hence, the alignment-assist and anti-skewing feature is provided without the need for the separate stopper 44 (which is of course optional in the first embodiment).

Figure 8A:
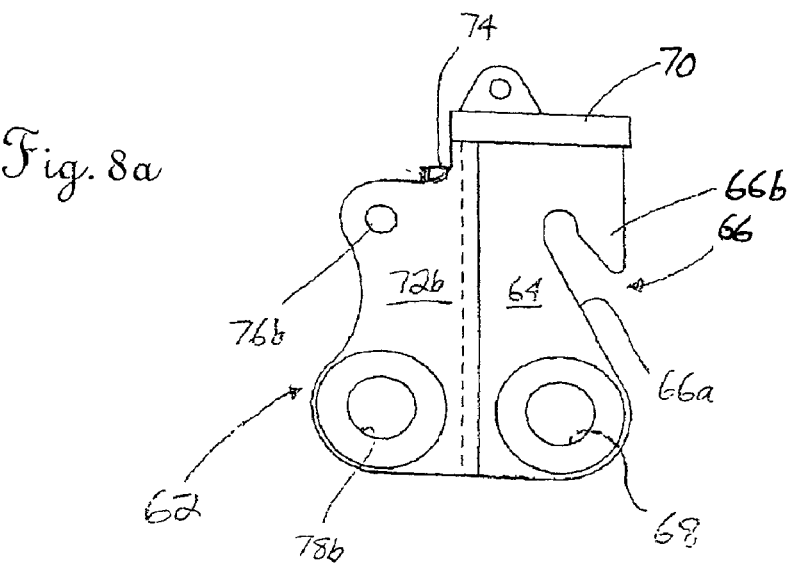
FIGS. 8a, 8b, 8c, and 8d are side elevational, top plan, and different end elevational views of one possible version of the extension component for use in the second embodiment of the present invention.
Figure 8B:
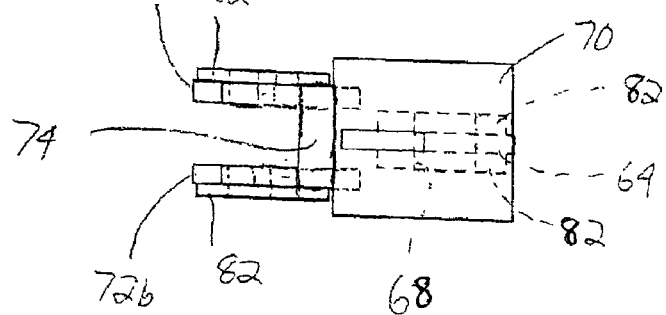
Figure 8C:
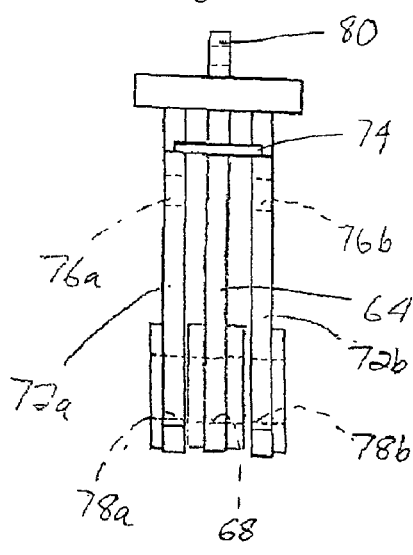
Figure 8D:
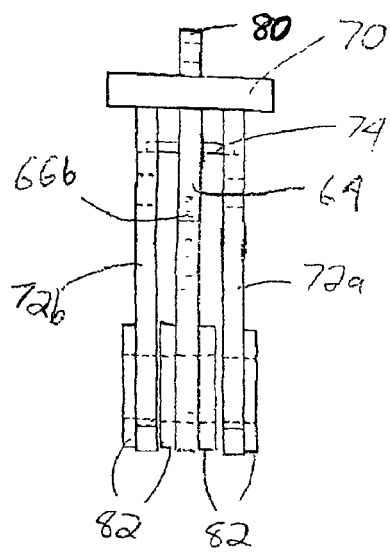

With reference to FIGS. 8a and 8d, it is also noted that projecting rings 82 may surround the apertures 68, 78a, 78b formed in the plates 64, 72a, 72b. Like rings 60, these structures close up gaps between plates 64, 72a, 72b that may otherwise exist, provide a limited guiding function, and generally serve to strengthen and stabilize the connections established using these structures. A savings in materials and concomitant reduction in weight is also provided, as compared to the case when the plates 64, 72a, 72b are designed to be substantially flush with one another (which would also make alignment for purposes of establishing the connection difficult). However, also like rings 60, the use of projecting rings 82 is considered optional.

In the foregoing description, use of the connection systems 10 of the present invention is described primarily with reference to a single mounting structure, such as stub axle 12a. However, it is emphasized that, in the case where there are two stub axles 12a, 12b projecting from each side of the vehicle or crane C, the system 10 of the invention may be employed at each location where the two-position extended and retracted mounting is desired. Moreover, in the case where the crawler track assembly $A_1$ or like ground-engaging motive device is connected to the corresponding vehicle at only a single location (such as, for example, where the vehicle is a hybrid that includes front wheels and rear crawler track assemblies), rather than two as shown, both embodiments of the system 10 can be adapted accordingly to establish the connection.

The foregoing description of the invention has been presented for purposes of illustration and description. The description is not intended to be exhaustive or to limit the invention to the precise form disclosed. Obvious modifications or variations are possible in light of the above teachings. For example, while spaced pairs of plates 22a, 22b are used in both embodiments described above, it should be appreciated that only a single plate 22a or 22b could include a single aperture 28a or 28b and receive or support a connector for engaging the first receiver 18 in the first embodiment. The same is true of spaced plates 72a, 72b on the extension component 62. In other words, to complete the connection, only two plates, not three are required (although three creates a stronger connection and one that is more easily established in view of the interleaving of the plate on the linking structure with the spaced plates on the mounting structure). The receivers 18, 66 could also be in the form of apertures and the connectors in the form of upstanding pins (not shown). It is also possible to reverse the positions of the receivers 18, 66 and the apertures 20, 38a, 38b or 20, 78a, 78b, in which case the position of apertures 26a, 26b, 36a, 36b, and 76a, 76b would also change in a corresponding fashion. In fact, instead of apertures, the connector pins could be held in slots formed in the sides of the corresponding plates. Another possibility is to switch the positions of the linking and mounting structures, which can be done without departing from the broadest aspects of the invention. Also, while the terms "pins" and "apertures" are used herein, it should be appreciated that any other type of male/female connectors would work for coupling a motive device to a vehicle. Other possibilities are to use the extension component 62 of the second embodiment in the first embodiment to connect the crawler track assembly or other motive device at a third position that is farther away from the crane C or vehicle than the extended position, to use two of the extension components together in the second embodiment to create such a third extended position, or to mix these two alternatives. The embodiments described were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A system intended for use in at least partially connecting a removable ground-engaging motive device to a vehicle in either an extended or a retracted mounting position using a plurality of connectors, comprising:

a first stable mounting structure associated with one of the motive device or the vehicle, the first mounting structure capable of supporting a first connector in a first position corresponding to the retracted position or supporting the first connector or another connector in a second position corresponding to the extended position, and including a first aperture for receiving a second connector in the retracted position and a second aperture for receiving the second connector in the extended position; and a first linking structure associated with the other of the motive device or the vehicle for engaging the first mounting structure in both the extended and retracted positions, the first linking structure including a first receiver for receiving and guiding the first connector into place such that a third aperture formed in the first linking structure aligns and registers with the first aperture in the retracted position or receiving and guiding either the first connector or another connector mounted in the second position such that the third aperture aligns and registers with the second aperture;

whereby the guidance provided by the first receiver in aligning the third aperture with the first or second apertures facilitates connecting the motive device to the vehicle in both the extended and refracted positions.

2. The system according to claim 1, wherein the first mounting structure is provided on the vehicle and the first linking structure is provided on the motive device.

3. The system according to claim 2, wherein the vehicle is a crane, the motive device is a crawler track assembly, the first mounting structure forms part of a stub axle projecting from a carbody of the crane, and the first linking structure forms part of an arm projecting from the crawler track assembly transverse to a direction of crane travel.

4. The system according to claim 1, wherein the first linking structure includes a fourth aperture for aligning and registering with the second aperture when the motive device is in the retracted position.

5. The system according to claim 4, wherein a third connector is positioned in the aligned second and fourth apertures.

6. The system according to claim 1, wherein the first stable mounting structure includes a pair of spaced plates having openings for slidably receiving the first connector.

7. The system according to claim 6, wherein the first connector is a pin generally aligned with a direction of vehicle travel and the first receiver includes an open-ended, specially contoured slot generally extending transverse to the direction of travel at an angle relative to a vertical plane and forming a hook-like projection, wherein the linking structure including the hook-like projection is lowered between the spaced plates such that the first receiver receives the pin and the contour of the slot guides the pin into a resting position.

8. The system according to claim 1, wherein the second connector is manually inserted or withdrawn from the first or second and third apertures when aligned and registered in the retracted or extended positions, respectively.

9. The system according to claim 1, wherein the second connector comprises the head end of a hydraulic or pneumatic cylinder, whereby the connector is inserted or withdrawn from the first or second and third apertures when aligned and registered by actuating the cylinder.

10. The system according to claim 1, wherein the first connector is positioned above the second connector in an operative position.

11. The system according to claim 1, further including a stopper for positioning between a face of the first linking structure and an opposing face of the first mounting structure in the extended position.

12. The system according to claim 11, wherein the first mounting structure includes a pair of spaced plates including openings for receiving the first connector in the retracted position, wherein the stopper includes a depending portion having an opening that aligns and registers with the openings in the plates for receiving a third connector in the extended position.

13. The system according to claim 1, further including:

a second stable mounting structure associated with one of the motive device or the vehicle, the second mounting structure supporting a third connector and including a fifth aperture for receiving a fourth connector in the retracted position and a sixth aperture for receiving the fourth connector in the extended position; and a second linking structure associated with the other of the motive device or the vehicle for engaging the second mounting structure, the second linking structure including a second receiver for receiving and guiding the third connector such that a seventh aperture formed in the second linking structure is in alignment and registered with the fifth aperture in the retracted position and in alignment and registered with the sixth aperture in the extended position.

14. The system according to claim 13, wherein the first and second mounting structures are provided on the vehicle, the corresponding first and second linking structures are provided on the motive device, the motive device is a first crawler track assembly, and the system further includes a second crawler track assembly having third and fourth linking structures identical to the first and second linking structures for engaging third and fourth stable mounting structures identical to the first and second mounting structures on a different side of the vehicle.

15. The system according to claim 1, wherein the first aperture is formed in and the first connector is supported by a portion of the first mounting structure associated with the vehicle in both the first and second positions, and the first mounting structure further comprises:

an extension component having the second aperture, a fourth aperture, and a second receiver for receiving and guiding the first connector such that the fourth aperture is in alignment and registers with the first aperture; and a third connector supported by the extension component, the first receiver of the first linking structure receiving and guiding the third connector such that the second aperture formed in the extension component and part of the first stable mounting structure aligns and registers with the third aperture for receiving a fourth connector.

16. A system intended for use in connecting at least one ground-engaging motive device to a vehicle in either an extended or a retracted position using a plurality of connectors, comprising:
  a first stable mounting structure associated with one of the motive device or the vehicle;
  a first linking structure associated with the other of the motive device or the vehicle for engaging the first mounting structure in the retracted position; and
  an extension component for attachment to both the first mounting structure and the first linking structure to connect the motive device to the vehicle in the extended position, wherein the extension component includes a receiver for receiving a hook on the end of a hoisting line used for raising and lowering the extension component.

17. The system according to claim 16, wherein:
  the first stable mounting structure is capable of receiving and supporting a first connector and includes a first aperture for receiving a second connector in the retracted position;
  the first linking structure includes a first receiver for receiving and guiding the first connector such that a second aperture in the first linking structure is in alignment and registered with the first aperture for receiving the second connector in the retracted position;
  the extension component includes a third aperture, a fourth aperture, and a second receiver for receiving and guiding the first connector such that the fourth aperture is in alignment and registers with the first aperture in the extended position,
  wherein the extension component is capable of receiving and supporting a third connector and the first receiver receives and guides the third connector such that the second aperture is in alignment and registered with the third aperture for receiving a fourth connector in the extended position;
  whereby the guidance provided by the first or second receiver in aligning the first, second, third, and fourth apertures facilitates insertion of the corresponding connectors and hence mounting of the motive device to the vehicle in both the extended and retracted positions.

18. The system according to claim 17, wherein the extension component comprises a pair of spaced plates including a pair of aligned openings for receiving the third connector.

19. The system according to claim 18, wherein:
  the first linking structure includes a member in which the first receiver and the second aperture are formed; and
  a first of the pair of spaced plates includes the third aperture, a second of the spaced plates includes a matching aperture, and the member in which the second aperture is formed is received between the plates, whereby the fourth connector extends through the third aperture, the matching aperture, and the second aperture when the three are aligned and registered to form a secure connection.

20. The system according to claim 18, wherein the first connector is a pin generally aligned with a direction of vehicle travel and the second receiver includes an open-ended, specially contoured slot generally extending transverse to a direction of vehicle travel at an angle relative to a vertical plane and forming a hook-like projection, wherein the extension component including the hook-like projection is lowered between the spaced plates such that the second receiver receives the pin and the contour of the slot guides the pin to a resting position.

21. The system according to claim 17, wherein the first mounting structure includes a pair of spaced plates having aligned openings for receiving the first connector corresponding to the second receiver.

22. The system according to claim 21, wherein:
  the extension component includes a member in which the second receiver and the fourth aperture are formed; and
  a first of the plates includes the first aperture, a second of the plates includes a matching aperture, and the member of the extension component is received in the space between the plates, whereby the fourth connector extends through the first aperture, the matching aperture, and the fourth aperture when the three are aligned and registered to form a secure connection.

23. The system according to claim 16, wherein the extension component includes a stopper for abutting with a face of the first mounting structure and an opposing face of the first linking structure in an operative position.

24. A system intended for connecting a crawler track to a crane in either an extended or retracted mounting position using first and second connectors, comprising:
  a stub axle associated with the crane, the stub axle capable of supporting the first connector in a first position corresponding to the retracted position and supporting the first connector or another connector in a second position corresponding to the extended position, and including a first aperture for receiving the second connector in the retracted position and a second aperture for receiving the second connector in the extended position; and
  an arm carried by the crawler track for engaging the stub axle in both the extended and retracted positions, the arm including a first receiver for receiving and guiding the first connector into place such that a third aperture formed in the arm aligns and registers with the first aperture in the retracted position or receiving and guiding either the first connector or another connector mounted in the second position such that the third aperture aligns and registers with the second aperture;
  whereby the guidance provided by the first receiver in aligning the third aperture with the first or second apertures facilitates connecting the crawler track to the crane in both the extended and retracted positions.

25. The system according to claim 24, wherein the first aperture is formed in and the first connector is supported by a portion of the stub axle in both the first and second positions, third and fourth connectors are provided, and the stub axle further comprises:
  an extension component having the second aperture, a fourth aperture, and a second receiver for receiving and guiding the first connector such that the fourth aperture is in alignment and registers with the first aperture, a third connector supported by the extension component, the first receiver receiving and guiding the third connector such that the second aperture formed in the extension component and part of the stub axle aligns and registers with the third aperture for receiving the fourth connector.

26. A system intended for use in connecting at least one ground-engaging motive device to a vehicle in either an extended or a retracted position using a plurality of connectors, comprising:

a first stable mounting structure associated with one of the motive device or the vehicle;

a first linking structure associated with the other of the motive device or the vehicle for engaging the first mounting structure in the retracted position;

an extension component for attachment to both the first mounting structure and the first linking structure to connect the motive device to the vehicle in the extended position, said extension component including a stopper for abutting with a face of the first mounting structure and an opposing face of the first linking structure in an operative position.

27. The system of claim 26, wherein the stopper is removable from the operative position apart from the extension component.

* * * * *

UNITED STATES PATENT AND TRADEMARK OFFICE
CERTIFICATE OF CORRECTION

| | | |
|---|---|---|
| PATENT NO. | : 6,848,522 B2 | Page 1 of 1 |
| APPLICATION NO. | : 10/126188 | |
| DATED | : February 1, 2005 | |
| INVENTOR(S) | : Donald E. Moore, Steven F. Wilms and Yukitsugu Suzuki | |

It is certified that error appears in the above-identified patent and that said Letters Patent is hereby corrected as shown below:

Column 17, line 38, Claim 1, please replace "refracted" with -- retracted --.

Signed and Sealed this

Twenty-fourth Day of April, 2007

JON W. DUDAS
*Director of the United States Patent and Trademark Office*